United States Patent
Umlauf

(10) Patent No.: US 7,739,178 B2
(45) Date of Patent: Jun. 15, 2010

(54) SYSTEM AND METHOD FOR EMULATING A LONG/SHORT HEDGE FUND INDEX IN A TRADING SYSTEM

(75) Inventor: Steven R. Umlauf, New York, NY (US)

(73) Assignee: Merrill Lynch Co., Inc., New York, NY (US)

( * ) Notice: Subject to any disclaimer, the term of this patent is extended or adjusted under 35 U.S.C. 154(b) by 99 days.

(21) Appl. No.: 12/022,730

(22) Filed: Jan. 30, 2008

(65) Prior Publication Data

US 2008/0195557 A1    Aug. 14, 2008

Related U.S. Application Data

(63) Continuation-in-part of application No. 11/676,683, filed on Feb. 12, 2007.

(51) Int. Cl.
    *G06Q 99/00* (2006.01)
(52) U.S. Cl. .................................................. 705/36 R
(58) Field of Classification Search .............. 705/35–40
    See application file for complete search history.

(56) References Cited

U.S. PATENT DOCUMENTS

| | | | |
|---|---|---|---|
| 5,126,936 A | 6/1992 | Champion et al. | 364/408 |
| 5,774,880 A | 6/1998 | Ginsberg | 705/36 |
| 5,784,696 A | 7/1998 | Melnikoff | 705/36 |
| 5,819,238 A | 10/1998 | Fernholz | 705/36 |
| 6,061,663 A | 5/2000 | Bloom et al. | 705/36 |
| 6,754,639 B2 | 6/2004 | Ginsberg | 705/36 |
| 6,922,677 B1 | 7/2005 | Sperandeo | 705/36 |

(Continued)

FOREIGN PATENT DOCUMENTS

WO    WO 01/86557 A1    11/2001

OTHER PUBLICATIONS

Can Hedge-Fund Returns Be Replicated?: The Linear Case, J. Hasanhodzicy and A. W. Lo, Aug. 16, 2006.*

(Continued)

*Primary Examiner*—Thu-Thao Havan
*Assistant Examiner*—Thomas M Hammond, III
(74) *Attorney, Agent, or Firm*—Baker Botts L.L.P.

(57) ABSTRACT

A system comprises a memory operable to store a compound index that is based at least in part on a plurality of component indices. The plurality of component indices comprise an international developed markets equity index, a U.S. large-cap equity index, and a U.S. small-cap equity index. The compound index is further based at least in part on a plurality of weights, wherein each weight is associated with a respective one of the plurality of component indices. The system further comprises a processor communicatively coupled to the memory and operable to update the plurality of weights according to a regression analysis. The regression analysis is based at least in part on a respective set of returns associated with each of the plurality of component indices and with a hedge fund index. The plurality of weights are updated such that the compound index emulates the hedge fund index. The processor is further operable to determine a current compound index value based at least in part on the plurality of component indices and on the updated plurality of weights. The processor is further operable to transmit the current compound index value to one or more clients.

18 Claims, 8 Drawing Sheets

U.S. PATENT DOCUMENTS

| | | | | |
|---|---|---|---|---|
| 7,062,459 | B1 | 6/2006 | Herbst et al. | 705/37 |
| 7,085,738 | B2 | 8/2006 | Tarrant | 705/36 |
| 7,099,838 | B1 | 8/2006 | Gastineau et al. | 705/35 |
| 7,366,692 | B2 * | 4/2008 | Alcaly et al. | 705/37 |
| 2002/0007329 | A1 | 1/2002 | Alcaly et al. | 705/35 |
| 2002/0178111 | A1 | 11/2002 | Woodley | 705/38 |
| 2003/0055777 | A1 | 3/2003 | Ginsberg | 705/37 |
| 2003/0069833 | A1 | 4/2003 | Rulison | 705/37 |
| 2003/0093354 | A1 | 5/2003 | Marshall | 705/36 |
| 2003/0120568 | A1 | 6/2003 | Chacko et al. | 705/35 |
| 2003/0233302 | A1 | 12/2003 | Weber et al. | 705/36 |
| 2004/0117284 | A1 | 6/2004 | Speth | 705/36 |
| 2004/0117291 | A1 | 6/2004 | O'Callahan | 705/37 |
| 2004/0139031 | A1 | 7/2004 | Amaitis et al. | 705/80 |
| 2004/0186803 | A1 | 9/2004 | Weber et al. | 705/35 |
| 2004/0199451 | A1 | 10/2004 | Benning et al. | 705/37 |
| 2004/0236661 | A1 | 11/2004 | Benning | 705/37 |
| 2004/0254871 | A1 | 12/2004 | Weiss | 705/36 |
| 2005/0171884 | A1 | 8/2005 | Arnott | 705/36 |
| 2006/0059074 | A1 | 3/2006 | Freund | 705/35 |
| 2006/0173763 | A1 | 8/2006 | O'Connor et al. | 705/35 |
| 2006/0184438 | A1 | 8/2006 | McDow | 705/35 |
| 2006/0253360 | A1 | 11/2006 | Gould | 705/35 |
| 2006/0253363 | A1 * | 11/2006 | Tarrant | 705/35 |
| 2006/0265302 | A1 | 11/2006 | Schmalenberger et al. | 705/35 |
| 2007/0043650 | A1 * | 2/2007 | Hughes et al. | 705/37 |

OTHER PUBLICATIONS

Factor Modeling and Benchmarking of Hedge Funds: Can Passive Investments in Hedge Fund Strategies Deliver? L. Jaeger and C. Wagner, Winter 2005.*

Global Indexing, SSGA.*

Hedge Fund Performance and Manger Skill, Edwards, F. R., and Caglayan, M. O., HJournal o fFutures Markes, 21(11), pp. 1003-1028, 2001.*

Laurence B. Siegel; *Distinguishing True Alpha From Beta*; CFA Institute Conference Proceedings; pp. 15-23, 2004.

Susan McCabe Walley; *Merrill Lynch, The Emergence of Passive Hedge Funds*; Merrill Lynch & Co., Inc.; 2 pages, Oct. 18, 2006.

*SGAM AI T-Rex Fund*; Alternative Investments, Societe Generale Asset Management; 6 pages, Aug. 2007.

Martin de Sa'Pinto; *SGAM Replicator Open to Institutions, Retail Investors*; 1 page, Aug. 6, 2007.

Emma Trincal; *LIPPER HedgeWorld; Who's Watching Your Back Office?*; HedgeWorld News; 2 pages, Jun. 22, 2007.

Deutsche Bank; *DBIQ Index Guide: DBIQ ImpAct Dollar Equity Volatility Index Quick*; 7 pages, Aug. 22, 2007.

Standard & Poor's; *S&P 500 Volatility Arbitrage Index*; 2 pages, Dec. 21, 2007.

Standard & Poor's; *S&P 500 Volatility Arbitrage Index; Index Methodology*; 10 pages, Jan. 2008.

Barclays Capital; *Equity Volatility—An Investment Tool in the Hunt for Absolute Returns*; 2 pages, Date unknown.

*Sungard Adaptiv Operations; Facing the Challenge—Industry Demands*; 8 pages, 2005.

*Lexdon The Business Library; NWQ Investment Management Co. to Deploy FlexTrader*; 3 pages, Oct. 2006.

*TechNewsWorld; Trading Greenhouse Gases and Carbon on the Internet, Part 2*; 7 pages, Jan. 2007.

*USPTO; Office Action* for U.S. Appl. No. 11/673,683, filed Feb. 12, 2007 in the name of Steven R. Umlauf; 23 pages, Apr. 14, 2009.

William Fung, et al.; *Empirical Characteristics of Dynamic Trading Strategies: The Case of Hedge Funds*; The Review of Financial Studies; vol. 10, No. 2; pp. 275-302, 1997.

Vikas Agarwal, et al.; *On Taking the "Alternative" Route: Rises, Rewards Style and Performance Persistence of Hedge Funds*; 39 pages, Feb. 1999.

Franklin R. Edwards, et al.; *Hedge Fund Performance and Manager Skill*; The Journal of Futures Market; vol. 21, No. 11; pp. 1003-1028, May 2001.

*Global Indexing*; State Street Global Advisors; 4 pages, 2004.

William Fung, et al.; *Hedge Fund Benchmarks: A Risk-Based Approach*; Financial Analysts Journal; vol. 60, No. 5; pp. 65-80, Sep./Oct. 2004.

Harry M. Kat, et al.; *Hedge Fund Returns: You Can Make Them Yourself!*; The Journal of Wealth Management; pp. 62-68, 2005.

*Why Accurately Replicated Hedge Fund Indices Won't Do You Much Good*; FundCreator; 5 pages, Feb. 28, 2007.

United States Patent and Trademark Office; *Office Action* for U.S. Appl. No. 11/673,683, filed Feb. 12, 2007 in the name of Steven R. Umlauf; 19 pages, Oct. 20, 2008.

*USPTO; Advisory Action* for U.S. Appl. No. 11/673,683, filed Feb. 12, 2007 in the name of Steven R. Umlauf; 11 pages, Jun. 30, 2009.

*USPTO; Advisory Action* for U.S. Appl. No. 11/673,683, filed Feb. 12, 2007 in the name of Steven R. Umlauf; 26 pages, Sep. 15, 2009.

* cited by examiner

FIG. 3

MARKET DATA

| DATE | SPTR INDEX | RU20 INDEX | INT INDEX | EMG INDEX | USD INDEX | LIBOR | HFRI INDEX |
|---|---|---|---|---|---|---|---|
| 11/30/2004 | 1740.32666 | 2612.53003 | 3023.1 | 170.567 | 81.82 | 2.29 | 2.84 |
| 12/01/2004 | 1766.903198 | 2653.54004 | 3041.509 | 170.767 | 81.56 | 2.30625 | |
| 12/02/2004 | 1765.37146 | 2648.73999 | 3056.416 | 171.756 | 81.95 | 2.33125 | |
| 12/03/2004 | 1766.627075 | 2647.52002 | 3075.44 | 171.526 | 80.98 | 2.34 | |
| 12/06/2004 | 1765.325684 | 2634.45996 | 3068.84 | 171.833 | 81.28 | 2.35 | |
| ... | ... | ... | ... | ... | ... | ... | ... |
| 10/27/2006 | 2114.647705 | 3228.18359 | 4277.5 | 282.11 | 85.56 | 5.32 | |
| 10/30/2006 | 2115.632813 | 3247.53174 | 4250.767 | 279.131 | 85.59 | 5.32 | |
| 10/31/2006 | 2115.653809 | 3232.75146 | 4261.458 | 281.995 | 85.32 | 5.32 | 1.78 |
| ... | ... | ... | ... | ... | ... | ... | ... |
| 11/28/2006 | 2133.519531 | 3269.40576 | 4301.123 | 295.646 | 83.13 | 5.32 | |
| 11/29/2006 | 2154.086182 | 3309.50415 | 4362.803 | 300.327 | 83.49 | 5.34938 | |
| 11/30/2006 | 2155.885254 | 3317.79004 | 4388.808 | 302.957 | 82.95 | 5.35 | 2.09 |

MONTHLY RETURNS

| DATE | SPTR INDEX | INT INDEX | EMG INDEX | RU20 INDEX | LIBOR | USD INDEX | HFRI INDEX |
|---|---|---|---|---|---|---|---|
| 12/31/2004 | 0.034028709 | 0.043862591 | 0.048028048 | 0.02959969 | 0.001971944 | -0.011855292 | 0.01650 |
| 01/31/2005 | -0.024374749 | -0.018347112 | 0.002539732 | -0.041723445 | 0.002066667 | 0.033642548 | -0.00210 |
| 02/28/2005 | 0.021043951 | 0.043209333 | 0.087248135 | 0.016938103 | 0.002014444 | -0.012683978 | 0.01830 |
| 03/31/2005 | -0.017707995 | -0.025122097 | -0.066087073 | -0.028627141 | 0.002338993 | 0.018785602 | -0.00870 |
| 04/30/2005 | -0.018965649 | -0.023510453 | -0.026844789 | -0.05726856 | 0.002391667 | 0.004401618 | -0.01500 |
| 05/31/2005 | 0.031818588 | 0.000483357 | 0.03480775 | 0.065450821 | 0.002659757 | 0.039440957 | 0.01040 |
| 06/30/2005 | 0.00141968 | 0.013269484 | 0.033975258 | 0.038572182 | 0.002608333 | 0.015154968 | 0.01590 |
| 07/31/2005 | 0.037188216 | 0.030655738 | 0.069897666 | 0.063353914 | 0.002876111 | 0.002918397 | 0.02300 |
| 08/31/2005 | -0.009123982 | 0.025266167 | 0.008563494 | -0.018541486 | 0.003030035 | -0.019809737 | 0.00820 |
| 09/30/2005 | 0.0080994 | 0.044541855 | 0.093114934 | 0.003138397 | 0.003083333 | 0.022151176 | 0.01930 |
| 10/31/2005 | -0.016670776 | -0.029205698 | -0.065361641 | -0.031048651 | 0.003327118 | 0.006143878 | -0.01410 |
| 11/30/2005 | 0.037822107 | 0.024455938 | 0.082724152 | 0.048544069 | 0.003408333 | 0.016653714 | 0.01660 |

| Date | | | | | | |
|---|---|---|---|---|---|---|
| 12/31/2005 | 0.00034811 | 0.0465338 | 0.059106766 | -0.004569459 | 0.003697396 | -0.004368243 | 0.01820 |
| 01/31/2006 | 0.026477802 | 0.061398727 | 0.111691402 | 0.089672314 | 0.003780278 | -0.02424043 | 0.03490 |
| 02/28/2006 | 0.002713297 | -0.00221204 | -0.001182925 | -0.002754064 | 0.003554444 | 0.012927158 | 0.00450 |
| 03/31/2006 | 0.01244752 | 0.032958458 | 0.008809132 | 0.048516088 | 0.00398964 | -0.004217068 | 0.01950 |
| 04/30/2006 | 0.01342784 | 0.047758741 | 0.072106819 | -0.000162285 | 0.004024483 | -0.040343252 | 0.01870 |
| 05/31/2006 | -0.028781399 | -0.038833748 | -0.104768929 | -0.056160611 | 0.00434 | -0.016142144 | -0.01560 |
| 06/30/2006 | 0.001355665 | -6.61231E-05 | -0.002444522 | 0.006432115 | 0.004258858 | 0.005193579 | -0.00240 |
| 07/31/2006 | 0.006168503 | 0.009898853 | 0.014313486 | -0.032539595 | 0.004593494 | 0.001643964 | -0.00180 |
| 08/31/2006 | 0.023793135 | 0.027494787 | 0.025480594 | 0.029605928 | 0.004641931 | -0.002930832 | 0.01010 |
| 09/30/2006 | 0.025769999 | 0.001546055 | 0.008326186 | 0.00832588 | 0.004441667 | 0.011522634 | 0.00160 |
| 10/31/2006 | 0.032586025 | 0.038894 | 0.074483025 | 0.05757797 | 0.00458273 | -0.008252935 | 0.01780 |
| 11/30/2006 | 0.019016081 | 0.029884138 | 0.074334651 | 0.026305326 | 0.004433333 | -0.027777778 | 0.02090 |

| CLOSING LEVELS - COMPOUND INDEX ||||||
|---|---|---|---|---|---|
| WEIGHT A | WEIGHT B | WEIGHT C | WEIGHT D | WEIGHT E | COMPOUND INDEX CLOSING LEVEL |
| -0.189 | 0.164 | 0.269 | 0.067 | 0.041 | 1442.53 |
| -0.189 | 0.164 | 0.269 | 0.067 | 0.041 | 1444.48 |
| -0.189 | 0.164 | 0.269 | 0.067 | 0.041 | 1446.62 |
| -0.189 | 0.164 | 0.269 | 0.067 | 0.041 | 1448.2 |
| ... | ... | ... | ... | ... | ... |
| -0.189 | 0.164 | 0.269 | 0.067 | 0.041 | 1463.47 |
| -0.198 | 0.176 | 0.219 | 0.09 | -0.009 | 1460.15 |
| -0.198 | 0.176 | 0.219 | 0.09 | -0.009 | 1451.24 |
| -0.198 | 0.176 | 0.219 | 0.09 | -0.009 | 1450.56 |

FROM FIG. 6A

SYSTEM AND METHOD FOR EMULATING A LONG/SHORT HEDGE FUND INDEX IN A TRADING SYSTEM

RELATED APPLICATION

This application is a continuation-in-part of U.S. application Ser. No. 11/673,683, filed Feb. 12, 2007 and entitled System and Method for Providing a Trading System Comprising a Compound Index.

TECHNICAL FIELD OF THE INVENTION

The present invention relates generally to electronic trading and more specifically to a system and method for emulating a long/short hedge fund index in a trading system.

BACKGROUND OF THE INVENTION

Traditional trading systems allow traders to pursue various investment schemes, including mutual funds and hedge funds. Some traders perceive hedge funds as providing greater returns than other types of investments. However, because hedge funds are actively managed, hedge funds are generally associated with higher fees than other types of investments. In addition, investments in hedge funds are generally not as liquid as investments in other types of assets.

SUMMARY OF THE INVENTION

In accordance with the present invention, the disadvantages and problems associated with prior trading systems have been substantially reduced or eliminated.

In some embodiments, a system comprises a memory operable to store a compound index that is based at least in part on a plurality of component indices. The plurality of component indices comprise an international developed markets equity index, a U.S. large-cap equity index, and a U.S. small-cap equity index. The compound index is further based at least in part on a plurality of weights, wherein each weight is associated with a respective one of the plurality of component indices. The system further comprises a processor communicatively coupled to the memory and operable to update the plurality of weights according to a regression analysis. The regression analysis is based at least in part on a respective set of returns associated with each of the plurality of component indices and with a hedge fund index. The plurality of weights are updated such that the compound index emulates the hedge fund index. The processor is further operable to determine a current compound index value based at least in part on the plurality of component indices and on the updated plurality of weights. The processor is further operable to transmit the current compound index value to one or more clients.

In certain embodiments, a method comprises storing a compound index that is based at least in part on a plurality of component indices. The plurality of component indices comprise an international developed markets equity index, a U.S. large-cap equity index, and a U.S. small-cap equity index. The compound index is further based at least in part on a plurality of weights, wherein each weight is associated with a respective one of the plurality of component indices. The method continues by updating the plurality of weights according to a regression analysis. The regression analysis is based at least in part on a respective set of returns associated with each of the plurality of component indices and with a hedge fund index. The plurality of weights are updated such that the compound index emulates the hedge fund index. The method continues by determining a current compound index value based at least in part on the plurality of component indices and on the updated plurality of weights. The method concludes by transmitting the current compound index value to one or more clients.

The invention has several important technical advantages. Various embodiments of the invention may have none, some, or all of these advantages. One advantage is that the trading system provides a weighted compound index associated with various component indices. In some embodiments, each component index is associated with assets having intraday liquidity. The transaction costs of trading these assets are generally lower than the transaction costs associated with hedge funds. Thus, the compound index offers more liquidity and lower fees than a hedge fund index.

Another advantage is that the trading system periodically updates the weights of the component indices that underlie the compound index. The trading system may configure the weights so that the compound index emulates the performance of a hedge fund index. Thus, the compound index may provide traders with returns similar to those provided by a hedge fund index.

Other advantages of the present invention will be readily apparent to one skilled in the art from the description and the appended claims.

BRIEF DESCRIPTION OF THE DRAWINGS

For a more complete understanding of the present invention and its advantages, reference is now made to the following description taken in conjunction with the accompanying drawings, in which:

FIG. 3 illustrates example market data, according to certain embodiments;

FIGS. 4A and 4B illustrate example returns associated with component indices, an interest rate, and a hedge fund index, according to certain embodiments;

FIGS. 6A and 6B illustrate a table comprising example closing levels of compound index, according to certain embodiments.

DETAILED DESCRIPTION OF THE INVENTION

Figure 1:
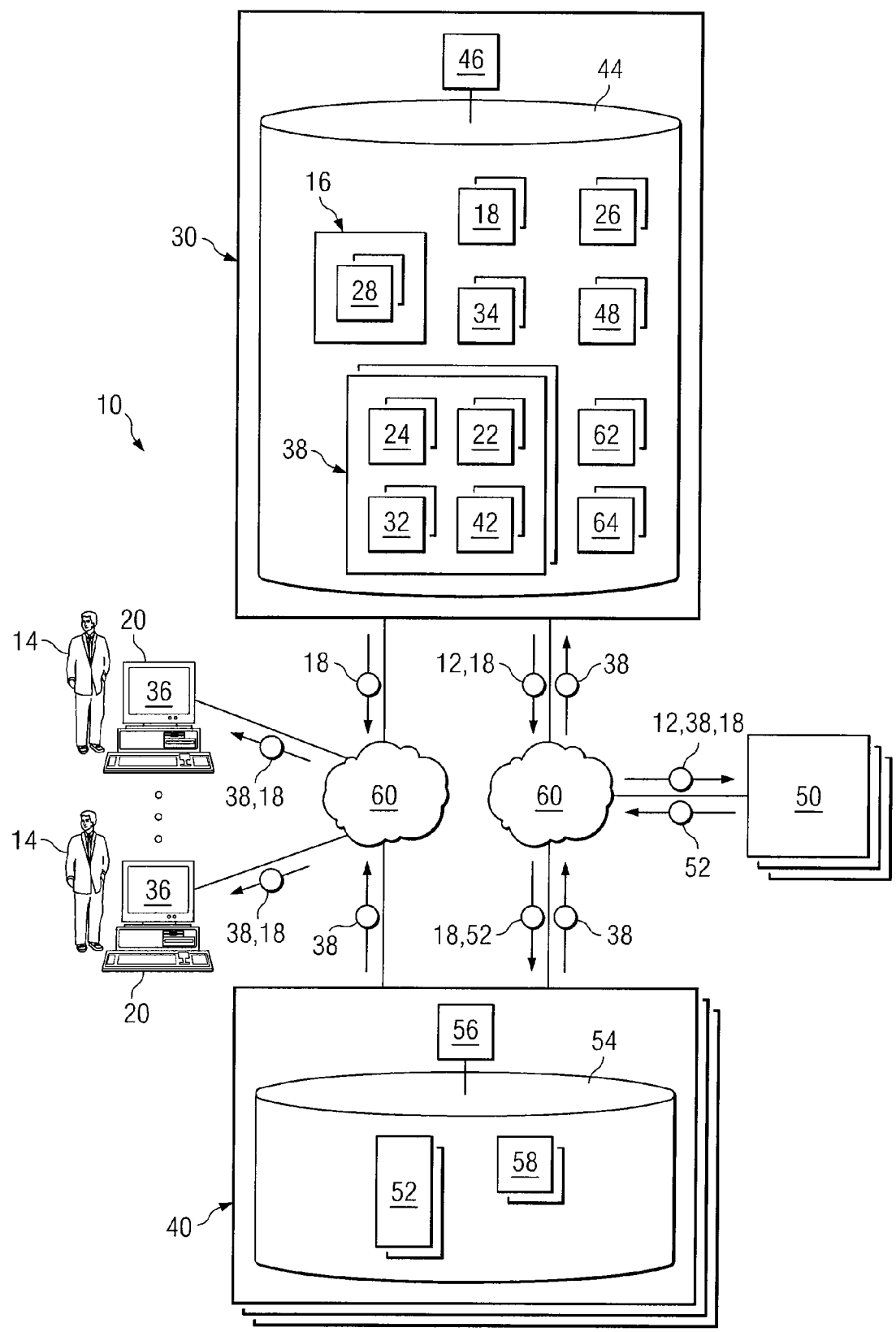
FIG. 1 illustrates a trading system, according to certain embodiments.

FIG. 1 illustrates a trading system 10, according to certain embodiments. Trading system 10 may comprise one or more clients 20, an index server 30, one or more market data servers 40, and one or more market centers 50 communicatively coupled by one or more networks 60.

Trading system 10 is operable to execute trading orders 12 submitted by traders 14. Trading system 10 is further operable to provide a financial indicator that emulates a hedge fund index 22. The financial indicator may be referred to as compound index 18. Compound index 18 is based at least in part on component indices 24 that are proportioned according to a particular weighting scheme. The particular weighting scheme allows compound index 18 to emulate hedge fund index 22. Component indices 24 may be associated with assets having intraday liquidity.

In conjunction with determining compound index 18, trading system 10 may provide compound index fund 16. In some embodiments, compound index fund 16 represents a liquid and tradable asset that is available to the trading public. According to certain embodiments, because compound index 18 emulates hedge fund index 22, compound index fund 16 provides traders 14 with both daily liquidity and hedge-fund-like returns 26.

As explained above, compound index 18 is based at least in part on a plurality of component indices 24. Each component index 24 is predicated on various investment instruments 28 such as, for example, equities, debt, currencies, commodities, stocks, bonds, futures contracts, derivatives, and/or any suitable instrument. A particular component index 24 is generally an indicator regarding the market value and/or performance of the particular investment instruments 28 that underlie the particular component index 24. Examples of component indices 24 include, but are not limited to, the Dow Jones Industrial Average, the German DAX, the British FTSE 100, the S&P 500 Total Return Index, the U.S. Dollar Index, the MSCI Emerging Markets Free Total Return Index, the MSCI EAFE U.S. Dollar Net Total Return Index, and the Russell 2000 Total Return Index.

Component indices 24 may be categorized according to various attributes. For example, the NASDAQ index may be categorized as a technology index because it is primarily based on securities associated with technology companies. As another example, the MSCI Emerging Markets Free Total Return Index, which is based on securities from global emerging markets, may be categorized as an international emerging markets equity index. In some embodiments, component indices 24 may be categorized as international developed markets equity indices, U.S. large-cap equity indices, U.S. small-cap equity indices, commodity indices, debt indices, currency indices, and/or any suitable type of index.

In addition, or as an alternative, to component indices 24, compound index 18 may be based at least in part on one or more interest rates 32. In some embodiments, interest rate 32 may be a short-term interbank lending rate. For example, compound index 18 may be based at least in part on the BBA One Month USD Libor. In other embodiments, interest rate 32 may be a prime rate, federal funds rate, mortgage rate, wholesale rate, retail rate, discount rate, and/or any number and combination of suitable lending rates.

Using current values of component indices 24, trading system 10 may determine a current value of compound index 18. As explained above, each of the component indices 24 associated with compound index 18 may be weighted such that compound index 18 emulates a particular hedge fund index 22. Generally, a hedge fund index 22 is predicated on multiple constituent hedge funds and represents an indicator of the market value of the multiple hedge funds associated with the particular hedge fund index 22. Compound index 18 may be configured to emulate any suitable hedge fund index 22. Examples of hedge fund indices 22 include, but are not limited to, the HFRI Fund Weighted Composite Index, the CSFB Credit Suisse/Tremont Hedge Fund Index, the FTSE Hedge Index, the DOW Jones Hedge Fund Index, the Eurekahedge Hedge Fund Index, the HFRI Equity Hedge Index, and/or any suitable hedge fund index 22.

According to certain embodiments, hedge fund index 22 represents an index of multiple hedge funds that employ long/short investment strategies (e.g., long/short equity strategies). An example of such hedge fund index 22 is the HFRI Equity Hedge Index. In some embodiments, a long/short investment strategy involves establishing a core holding of long equities that are hedged with short sales of stocks and/or stock index options. In other embodiments, a long/short investment strategy involves establishing a long position in currencies, debt, commodities, stocks, bonds, futures contracts, derivatives, and/or any suitable investment instrument 28 hedged with a short position in any suitable number and combination of investment instruments 28. The holdings of a hedge fund that employs a long/short investment strategy may be selected based on an analysis of individual companies as well as risks and opportunities offered by particular industries, sectors, and/or countries. In some embodiments, a fund manager associated with a hedge fund that employs a long/short investment strategy may attempt to achieve neutrality and/or reduce volatility by diversifying and/or hedging positions across individual regions, industries, sectors, and/or market capitalization bands. By configuring compound index 18 to replicate hedge fund index 22 that is based on hedge funds that employ long/short investment strategies (such as, for example, the HFRI Equity Hedge Index), compound index 18 may replicate the performance of long/short investment strategies.

In some embodiments, the respective weights 34 of component indices 24 may be updated periodically (e.g., weekly, bi-weekly, monthly, and/or according to any suitable time period). Weights 34 may be determined based at least in part on returns 26 of the respective component indices 24 and on returns 26 of the particular hedge fund index 22 that compound index 18 is configured to emulate. In some embodiments, a regression analysis may be performed to determine the respective weights 34 of the component indices 24. The respective weights 34 of component indices 24 may be determined such that compound index 18 emulates the performance of the particular hedge fund index 22. Compound index 18 may emulate the performance of hedge fund index 22 by tracking or replicating the movements of hedge fund index 22. Because compound index 18 may emulate hedge fund index 22, returns 26 of compound index 18 may be similar to returns 26 of hedge fund index 22.

As explained above, trading system 10 comprises one or more clients 20. Client 20 represents any suitable local or remote end-user device that may be used by traders 14 to access one or more elements of trading system 10, such as index server 30. Trader 14 may use client 20 to submit deposits, make withdrawals, request information, and/or communicate with various components of trading system 10. In some embodiments, trader 14 may use client 20 to invest in funds that are managed by index server 30. A particular client 20 may comprise a computer, workstation, telephone, Internet browser, electronic notebook, Personal Digital Assistant (PDA), pager, or any other suitable device (wireless, wireline, or otherwise), component, or element capable of receiving, processing, storing, and/or communicating information with other components of trading system 10. Client 20 may also comprise any suitable user interface such as a display, microphone, keyboard, or any other appropriate terminal equipment according to particular configurations and arrangements. It will be understood that trading system 10 may comprise any number and combination of clients 20. In some embodiments, client 20 may comprise a graphical user interface (GUI) 36.

GUI 36 is generally operable to tailor and filter data presented to trader 14. GUI 36 may provide trader 14 with an efficient and user-friendly presentation of trading orders 12, market data 38, and/or other suitable information. GUI 36 may comprise a plurality of displays having interactive fields, pull-down lists, and buttons operated by trader 14. In one example, GUI 36 presents relevant market data 38 to trader 14 and conceals the remaining information to reduce visual clutter. Then, upon receiving a request from trader 14, GUI 36 expands the visual representation of market data 38 to display account information, market information, and/or other suitable information. GUI 36 may include multiple levels of abstraction including groupings and boundaries. It should be understood that the term graphical user interface may be used in the singular or in the plural to describe one or more graphical user interfaces 36 and each of the displays of a particular graphical user interface 36.

Although clients 20 are described herein as being used by "traders", it should be understood that the term "trader" is meant to broadly apply to any user of trading system 10, whether that user is an agent acting on behalf of a principal, a principal, an individual, a legal entity (such as a corporation), or any machine or mechanism that is capable of participating in transactions in trading system 10.

Trader 14 may use client 20 to communicate with index server 30. Index server 30 is generally operable to monitor component indices 24. Based at least in part on the movement of component indices 24, index server 30 is operable to update compound index 18. In some embodiments, index server 30 is operable to manage compound index fund 16 associated with compound index 18. (Compound index fund 16 is described in detail with respect to FIG. 2.)

Index server 30 is operable to update compound index 18 periodically (e.g., hourly, daily, weekly, and/or according to any suitable time period). In some embodiments, index server 30 re-calculates compound index 18 on a daily basis. The daily value of a particular indicator (e.g., component index 24, compound index 18, interest rate 32, and/or hedge fund index 22) may be referred to as the closing level 42 of that indicator. In some embodiments, closing level 42 refers to the official value of an indicator as published by market data server 40 at a configurable time on a given business day. Index server 30 is operable to transmit closing level 42 of compound index 18 to market data server 40.

Index server 30 may comprise any suitable combination of hardware and/or software implemented in one or more modules to provide the described functions and operations. In some embodiments, index server 30 may comprise a general-purpose personal computer (PC), a Macintosh, a workstation, a Unix-based computer, a server computer, or any suitable processing device. In some embodiments, the functions and operations described above may be performed by a pool of multiple index servers 30. A particular index server 30 may comprise an index memory 44 and an index processor 46.

Index memory 44 comprises any suitable arrangement of random access memory (RAM), read only memory (ROM), magnetic computer disk, CD-ROM, or other magnetic or optical storage media, or any other volatile or non-volatile memory devices that store one or more files, lists, tables, or other arrangements of information such as market data 38. Although FIG. 1 illustrates index memory 44 as internal to index server 30, it should be understood that index memory 44 may be internal or external to index server 30, depending on particular implementations. Also, index memory 44 may be separate from or integral to other memory devices to achieve any suitable arrangement of memory devices for use in trading system 10.

Index memory 44 is generally operable to store index logic 48. Index logic 48 generally comprises rules, algorithms, code, tables, and/or other suitable instructions for updating compound index 18 and managing compound index fund 16. Index memory 44 is further operable to store market data 38, compound index fund 16, and compound index 18.

Index memory 44 is communicatively coupled to index processor 46. Index processor 46 is generally operable to execute index logic 48 stored in index memory 44 to calculate compound index 18 and to manage compound index fund 16. Index processor 46 may comprise any suitable combination of hardware and software implemented in one or more modules to provide the described function or operation.

According to certain embodiments, index server 30 may trade the assets of compound index fund 16 such that compound index fund 16 tracks compound index 18. To trade the assets of compound index fund 16, index server 30 may generate and transmit trading orders 12 to market center 50. Trading orders 12 may comprise orders to trade investment instruments 28 such as, for example, equities, currencies, commodities, treasury notes, debt, credit, stocks, bonds, futures contracts, options, derivatives, and/or any suitable instrument. Trading orders 12 may comprise bids, offers, market orders, limit orders, stop loss orders, day orders, open orders, GTC ("good till cancelled") orders, "good through" orders, "all or none" orders, "any part" orders, or any other suitable order for trading.

Index server 30 may transmit trading orders 12 to one or more market centers 50. Market center 50 is generally operable to receive and execute trading orders 12. Once a particular trading order 12 is executed, market center 50 is operable to generate and transmit a trade confirmation message to index server 30. Market center 50 is further operable to transmit trading data 52 to market data server 40. Trading data 52 may comprise information regarding trading activities in market center 50. In particular, trading data 52 may comprise information regarding best bid prices, best offer prices, trading volumes, volatility, and/or any other suitable information regarding trading activity in market center 50. In some embodiments, trading data 52 represents raw data regarding conditions in market center 50.

Market centers 50 may comprise all manner of order execution venues including exchanges, Electronic Communication Networks (ECNs), Alternative Trading Systems (ATSs), market makers, or any other suitable market participants. Each market center 50 may maintain a bid and offer price for at least one investment instrument 28 by standing ready, willing, and able to buy or sell that investment instrument 28 at publicly quoted prices, also referred to as market center prices. Different market centers 50 may provide different market center prices for particular investment instruments 28. For example, a particular market center 50 may offer a particular bid price and/or offer price for a particular investment instrument 28, while another market center 50 may offer a different bid price and/or offer price for the same investment instrument 28.

Market center 50 may be communicatively coupled via network 60 to market data server 40. Market data server 40 is generally operable to receive and process trading data 52 from market center 50. Market data server 40 may process trading data 52 to generate market data 38. Market data 38 may comprise current and/or historical information regarding any suitable index, financial instrument, mutual fund, hedge fund, exchange traded fund ("ETF"), interest rate 32, investment instrument 28, trader 14, and/or any suitable number and combination of indicators regarding trading system 10. In particular, market data 38 may comprise current and/or historical values of component indices 24, interest rates 32, and hedge fund indices 22. In some embodiments, market data server 40 may be operated by a financial news service organization such as, for example, Bloomberg, L.P. In other embodiments, market data server 40 may be operated by a market maker, brokerage firm, bank, market center 50, and/or any suitable financial services entity.

Market data server 40 may comprise any suitable combination of hardware and/or software implemented in one or more modules to provide the described functions and operations. In some embodiments, market data server 40 may comprise a general-purpose personal computer (PC), a Macintosh, a workstation, a Unix-based computer, a server computer, or any suitable processing device. In some embodiments, the functions and operations described above may be performed by a pool of multiple market data servers 40. A particular market data server 40 may comprise a market data memory 54 and a market data processor 56.

Market data memory 54 comprises any suitable arrangement of random access memory (RAM), read only memory (ROM), magnetic computer disk, CD-ROM, or other magnetic or optical storage media, or any other volatile or non-volatile memory devices that store one or more files, lists, tables, or other arrangements of information. Although FIG. 1 illustrates market data memory 54 as internal to market data server 40, it should be understood that market data memory 54 may be internal or external to market data server 40, depending on particular implementations. Also, market data memory 54 may be separate from or integral to other memory devices to achieve any suitable arrangement of memory devices for use in trading system 10.

Market data memory 54 is generally operable to store trading data 52 from market centers 50. Market data memory 54 is further operable to store market data logic 58. Market data logic 58 generally comprises rules, algorithms, code, tables, and/or other suitable instructions for generating market data 38 based at least in part on trading data 52.

Market data memory 54 may be communicatively coupled to market data processor 56. Market data processor 56 is generally operable to execute market data logic 58 to generate market data 38. Market data processor 56 comprises any suitable combination of hardware and software implemented in one or more modules to provide the described function or operation.

As explained above, clients 20, index server 30, market data servers 40, and market centers 50 may be communicatively coupled via one or more networks 60. Network 60 may represent any number and combination of wireline and/or wireless networks suitable for data transmission. Network 60 may, for example, communicate internet protocol packets, frame relay frames, asynchronous transfer mode cells, and/or other suitable information between network addresses. Network 60 may include one or more intranets, local area networks, metropolitan area networks, wide area networks, cellular networks, all or a portion of the Internet, and/or any other communication system or systems at one or more locations.

It should be understood that the internal structure of trading system 10 and the servers, processors, and memory devices associated therewith is malleable and can be readily changed, modified, rearranged, or reconfigured to achieve the intended operations of trading system 10.

In operation, compound index 18 is based at least in part on component indices 24 that are proportioned according to a particular weighting scheme. Index server 30 is operable to determine a respective weight 34 for each component index 24 that underlies compound index 18. The respective weights 34 may be determined such that compound index 18 emulates a particular hedge fund index 22. In some embodiments, index server 30 may re-calculate the respective weights 34 on a periodic basis (e.g., weekly, monthly, bimonthly, etc.). The day on which index server 30 re-calculates the respective weights 34 may be referred to as the rebalancing day 62.

To re-calculate the respective weights 34, index server 30 may determine, based at least in part on market data 38, returns 26 associated with component indices 24 and hedge fund index 22. The determined returns 26 may be weekly returns 26, monthly returns 26, and/or returns 26 associated with any suitable time period. Return 26 of a particular indicator (e.g., component index 24, interest rate 32, and hedge fund index 22) refers to the change in value of the particular indicator over a particular time period. For example, a monthly return 26 of component index 24 represents the increase or decrease in value of component index 24 over a given month. In some embodiments, return 26 may be expressed as a percentage, as a currency amount, and/or according to any suitable metric.

Based at least in part on the determined returns 26, index server 30 is operable to determine a respective weight 34 for each component index 24 and/or for interest rate 32. According to certain embodiments, the respective weights 34 may be determined based at least in part on a regression analysis. The respective weights 34 may be determined such that compound index 18 emulates the performance of the particular hedge fund index 22.

According to certain embodiments, the regression analysis may be based at least in part on multiple returns 26 from a configurable sampling period 64. Sampling period 64 refers to one or more intervals of time for which returns 26 are input into the regression analysis. For example, if sampling period 64 is twenty-four months, then monthly returns 26 for each of the past twenty-four months may be input into the regression analysis to update weights 34 of component indices 24. The sampling period 64 may be twelve months, twenty-four months, thirty-six months, and/or any suitable period of time.

After updating the respective weights 34 of component indices 24, index server 30 may periodically determine closing level 42 of compound index 18. In some embodiments, index server 30 updates closing level 42 of compound index 18 on a daily basis. Index server 30 may determine closing level 42 of compound index 18 based at least in part on closing levels 42 of component indices 24 and on the current weights 34 of component indices 24. Closing level 42 of compound index 18 may be further based at least in part on interest rate 32.

As explained above, weights 34 may be updated periodically (e.g., monthly, bimonthly, etc.). Because weights 34 are updated based at least in part on a particular hedge fund index 22, the performance of compound index 18 emulates the particular hedge fund index 22.

Figure 2:
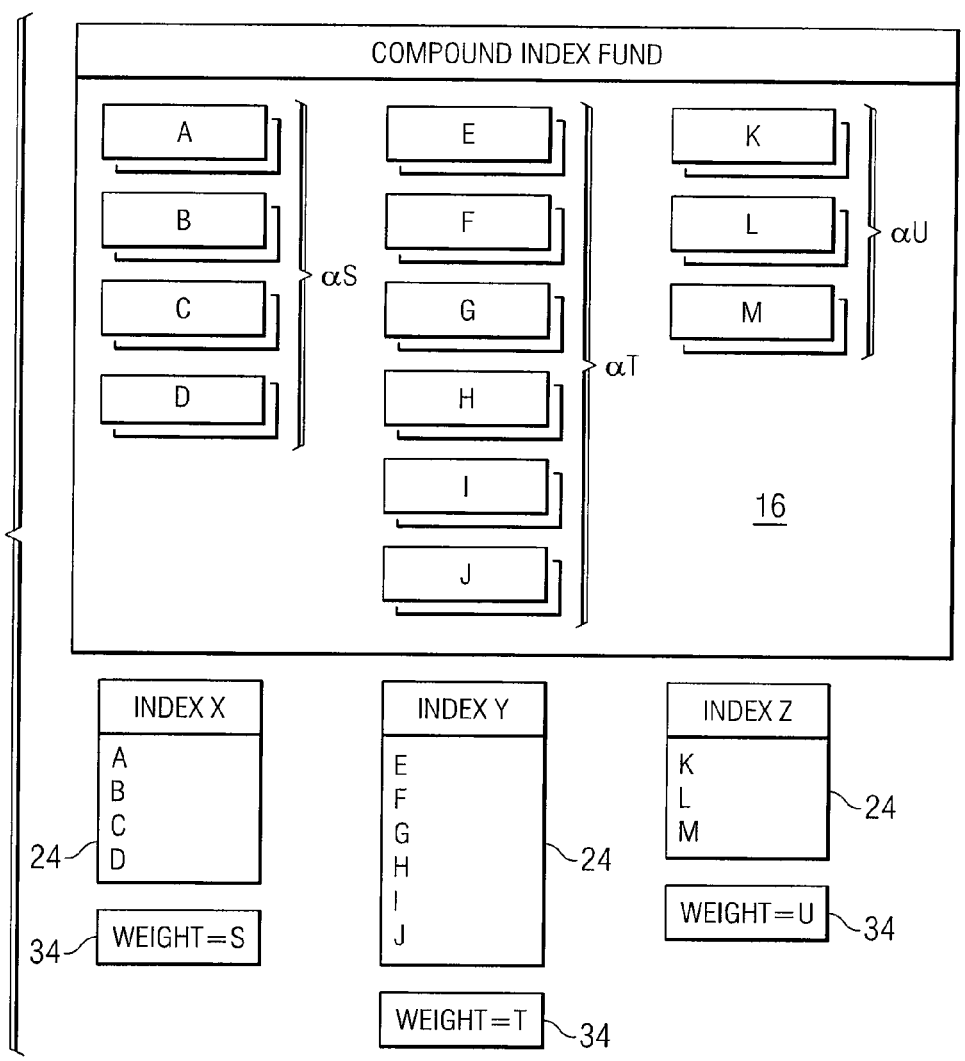
FIG. 2 illustrates an example compound index fund, according to certain embodiments.

FIG. 2 illustrates an example compound index fund 16, according to certain embodiments. Compound index fund 16 generally holds a plurality of investment instruments 28 from each component index 24 associated with compound index 18. The overall performance of compound index fund 16 depends, at least in part, on the particular investment instruments 28 held by compound index fund 16. The proportions of investment instruments 28 in compound index fund 16 depend, at least in part, on weights 34 associated with component indices 24.

An example illustrates certain embodiments. In this example, compound index fund 16 is associated with three component indices 24—Component Index X, Component Index Y, and Component Index Z. Component Index X is associated with Securities A-D, Component Index Y is associated with Notes E-J, and Component Index Z is associated with Commodities K-M. Compound index fund 16 is associated with compound index 18, which is configured to emulate a particular hedge fund index 22. In this example, based at least in part on a regression analysis of Component Indices X, Y, and Z and on the particular hedge fund index 22, index server 30 determines that Component Index X is associated with Weight S, Component Index Y is associated with Weight T, and Component Index Z is associated with Weight U.

In the present example, compound index fund 16 holds each of Securities A-D, each of Notes E-J, and each of Commodities K-M. The number of Securities A-D in compound index fund 16 is proportional to Weight S. The number of Notes E-J in compound index fund 16 is proportional to Weight T. The number of Commodities K-M in compound index fund 16 is proportional to Weight U.

Index server 30 may re-calculate Weights S, T, and U periodically. If the re-calculation causes a change in any of Weights S, T, and U, index server 30 may adjust the proportions of investment instruments 28 in compound index fund 16 accordingly. To adjust the proportions of investment instruments 28 in compound index fund 16, index server 30 may generate and transmit trading orders 12 to market centers 50.

It should be understood that, in a particular component index 24, the underlying investment instruments 28 (e.g., securities, notes, etc.) may be represented in different proportions. In other words, a particular component index 24 may internally weigh the investment instruments 28 that underlie that particular component index 24. Investment instruments 28 in some indices may be price weighted, market-value weighted, and/or capitalization weighted. Index server 30 may configure compound index fund 16 such that the proportions of investment instruments 28 in compound index fund 16 reflect weights 34 of component indices 24 as well as any internal weightings of a particular component index 24.

In the foregoing example, compound index fund 16 holds each investment instrument 28 from each of Component Indices X, Y, and Z. In other embodiments, compound index fund 16 may hold representative investment instruments 28 from each component index 24 according to a statistical sampling of the market.

FIGS. 3-6 illustrate, in part, sample data and calculations regarding an example compound index 18. In particular, FIGS. 3-6 illustrate example returns 26 of component indices 24, example weights 34 of component indices 24, and example closing levels 42 of compound index 18, according to certain embodiments.

In the present example, compound index 18 is configured to emulate a particular hedge fund index 22—namely, the HFRI Fund Weighted Composite Index ("the HFRI Index"). In this example, compound index 18 is based at least in part on five component indices 24—namely, the S&P 500 Total Return Index ("the SPTR index"), the Russell 2000 Total Return Index ("the RU20 index"), the MSCI EAFE U.S. Dollar Net Total Return Index ("the INT index"), the MSCI Emerging Markets Free Total Return Index ("the EMG index"), and the U.S. Dollar Index ("the USD index"). In addition, compound index 18 is based at least in part on a particular interest rate 32—the BBA One Month USD Libor ("the Libor").

FIG. 3 illustrates example market data 38 that is stored in index memory 44 and that is used to determine compound index 18, according to certain embodiments. Index server 30 receives market data 38 from market data server 40 on a substantially continuous basis. In this example, market data 38 comprises closing levels 42 of the five component indices 24, the Libor, and the HFRI index. Index server 30 is operable to store this information in index memory 44. As illustrated in FIG. 3, for Nov. 30, 2006, index server 30 determines, based at least in part on market data 38, that the SPTR index is valued at 2155.885254, the RU20 index is valued at 3317.79004, the INT index is valued at 4388.808, the EMG index is valued at 302.957, and so forth.

In some embodiments, market data server 40 does not publish each day a particular closing level 42 for hedge fund index 22. In certain embodiments, closing level 42 for hedge fund index 22 may be published monthly.

According to some embodiments, returns 26 of the various indicators (e.g., component indices 24, interest rate 32, and hedge fund index 22) may be calculated for configurable intervals (e.g., weeks, months, etc.). In certain embodiments, the last day of a given interval may be referred to as the observation day 66. Trading system 10 may be configured such that observation day 66 corresponds with the day on which market data server 40 publishes closing level 42 of hedge fund index 22.

In the present example, returns 26 of the various indicators are determined on a monthly basis. In this example, observation day 66 is the last day of each calendar month.

FIGS. 4A and 4B illustrate monthly returns 26 associated with the five component indices 24, the Libor, and the HFRI index. In this example, index server 30 determines monthly returns 26 as follows:

$$\text{Libor return} = \text{Libor closing level}_{OD-1} * (\text{ACTUAL}/360)/100$$

The returns of the respective indices (e.g., the SPTR, RU20, INT, EMG, USD, and HFRI indices) are determined according to the following formula: return of respective index=(respective index closing level$_{OD}$/respective index closing level$_{OD-1}$)−1

In the foregoing formulas, "closing level$_{OD}$" refers to closing level 42 of the particular indicator (e.g., index or Libor) on a given observation day 66. "Closing level$_{OD-1}$" refers to closing level 42 of the particular indicator (e.g., index or Libor) one calendar month prior to the given observation day 66. With respect to the Libor return 26, "ACTUAL" refers to the actual number of days in the calendar month in which the given observation day 66 resides.

In the present example, index server 30 determines the monthly Libor return 26 for November 2006. In particular, based at least in part on market data 38 from FIG. 3, index server 30 determines that Libor closing level$_{OD-1}$=5.32 (e.g., closing level 42 of the Libor on the prior observation day 66). Index server 30 further determines that ACTUAL=30 (the actual number of days in November). Thus, index server 30 determines that the monthly Libor return 26 for November 2006 is 0.004433333. Index server 30 stores the determined Libor return 26 in index memory 44.

In the present example, index server 30 further determines the monthly SPTR index return 26 for November 2006. Based at least in part on market data 38 illustrated in FIG. 3, index server 30 determines that the SPTR index closing level$_{OD}$=2155.885254 (e.g., closing level 42 of the SPTR index as of Nov. 30, 2006). Index server 30 further determines that SPTR index closing level$_{OD-1}$=2115.653809 (e.g., closing level 42 of the SPTR index as of Oct. 31, 2006). Accordingly, index server 30 determines that the monthly SPTR index return 26 for November 2006 is 0.019016081. Index server 30 stores the determined monthly return 26 of SPTR index in index memory 44. In the present example, index server 30 repeats the foregoing procedure with respect to the RU20, INT, EMG, USD, and HFRI indices.

In the present example, index server 30 stores monthly returns 26 for sampling period 64 of twenty-four months. Monthly returns 26 from sampling period 64 are input into a regression calculation for updating weights 34 associated with component indices 24. Each month, returns 26 from the earliest month in sampling period 64 may be discarded and returns 26 from the most recent month may be added to returns 26 associated with sampling period 64.

In some embodiments, market data server 40 may not publish closing level 42 of hedge fund index 22 for a particular observation day 66 until one or more days after the particular observation day 66. Accordingly, in some embodiments, index server 30 may not determine return 26 of hedge fund index 22 for a particular month until sometime during the following month.

In the present example, index server 30 is configured to rebalance weights 34 associated with the five component indices 24 once each month. The day on which index server 30 rebalances the respective weights 34 is referred to as rebalancing day 62. In this example, rebalancing day 62 is the second business day following the day on which market data server 40 publishes the monthly closing level 42 (e.g., "end update") of the HFRI index. As explained above, index server 30 may, on each rebalancing day 62, re-calculate the respective weights 34 associated with component indices 24. Although the present example illustrates rebalancing day 62 as the second business day following the publication of the end update of the HFRI index, it should be understood that rebalancing day 62 may be any suitable day (e.g., last day of the month, first day of the month, first day of the week, etc.).

Figure 5:
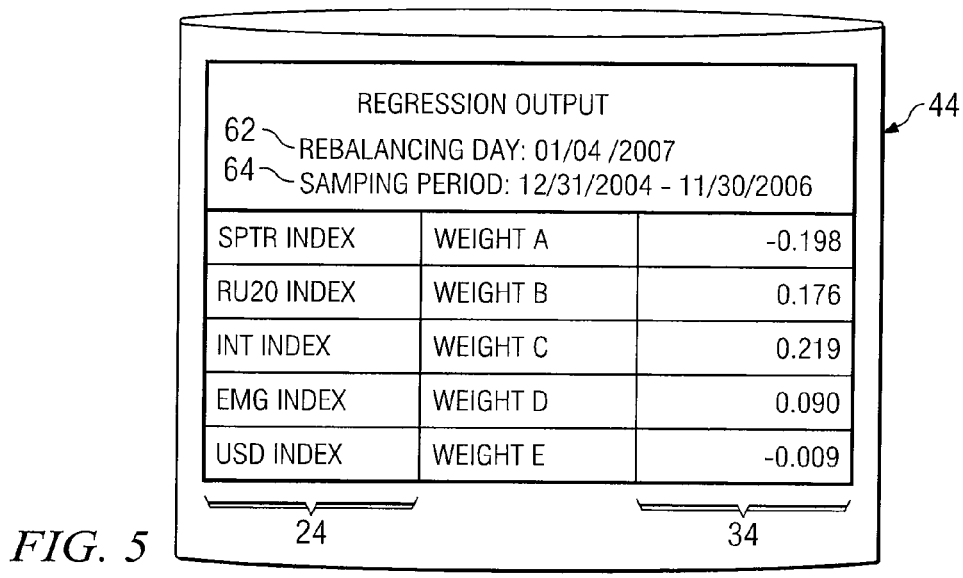
FIG. 5 illustrates example weights associated with component indices, according to certain embodiments.

FIG. 5 illustrates the results of an example linear regression analysis based at least in part on returns 26 illustrated in FIGS. 4A and 4B. The respective weights 34 of the five component indices 24 are determined in this example by performing a multiple linear regression according to the following formula:

HFRI index return−Libor return=Constant+Weight $A$*(SPTR index return−Libor return)+Weight $B$*(RU20 return−Libor return)+Weight $C$*(INT index return−Libor return)+Weight $D$*(EMG index return−Libor return)+Weight $E$*USD index return In the foregoing formula, "return" refers to the determined monthly return 26 of the respective indicator (i.e., Libor or index) for the second month preceding the current rebalancing day 62. Thus, if the current rebalancing day 62 is Jan. 4, 2007, "return" refers to return 26 for November 2006. In some embodiments, the reason for not including returns 26 from December 2006 is that market data server 40 may not publish the December return 26 of hedge fund index 22 until the end of January or the beginning of February. In other embodiments, however, returns 26 from the most recent month may be included in the regression analysis.

In this example, the value of "Constant" may be determined by executing the multiple linear regression according to a least squares method. Like Weights A-E, the actual value of "Constant" may be solved for by executing the linear regression.

In this example, sampling period 64 for the regression analysis is the twenty-four month period ending on the second month preceding the current rebalancing day 62. Thus, if the current rebalancing day 62 is Jan. 4, 2007, sampling period 64 is from December 2004 through November 2006.

In the present example, on Jan. 4, 2007, index server 30 performs the foregoing linear regression based at least in part on returns 26 illustrated in FIGS. 4A and 4B. According to the regression analysis, index server 30 determines that Weight A is −0.198, Weight B is 0.176, Weight C is 0.219, Weight D is 0.090, and Weight E is −0.009. Index server 30 stores Weights A-E in index memory 44.

Figure 6A:
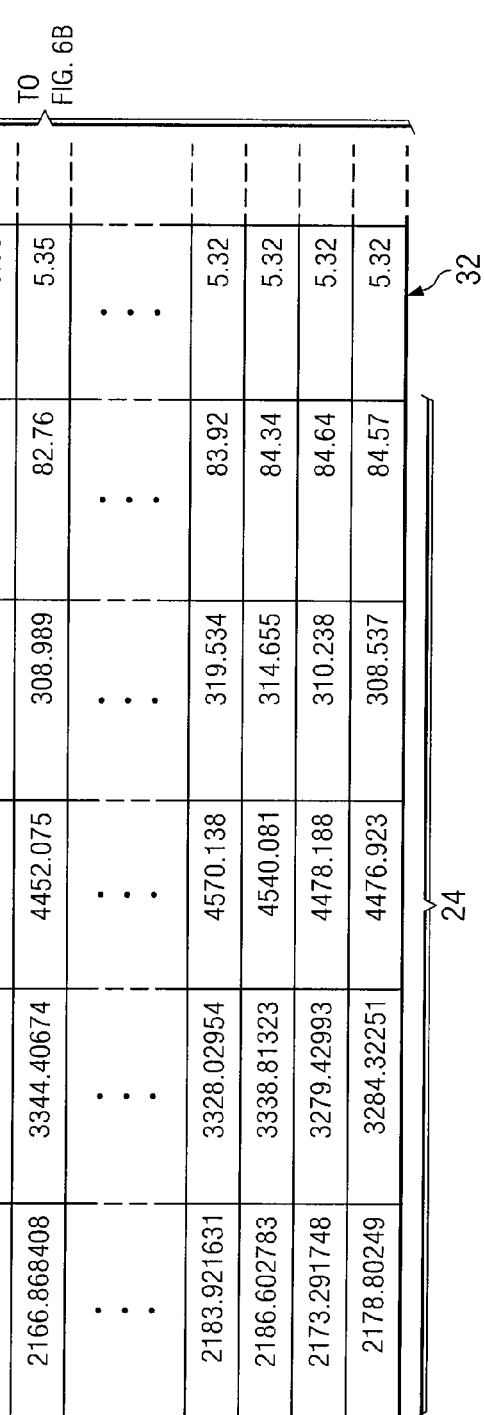

After updating Weights A-E on a given rebalancing day 62, index server 30 may use Weights A-E during the ensuing month to determine closing level 42 of compound index 18 on a daily basis. FIGS. 6A and 6B illustrate a table comprising example closing levels 42 of compound index 18, according to certain embodiments. In the present example, index server 30 is configured to determine closing level 42 of compound index 18 on each business day. To determine closing level 42 of compound index 18 on a given day, index server 30 first determines the accumulated total return ("ATR") associated with the Libor and the component indices 24. ATR is determined according to the following formula:

ATR=Weight $X$*(Libor$_{RD}$*(DAYS/365))+Weight $A$*((SPTR index closing level$_{ICD}$/SPTR index closing level$_{RD}$)−1)+Weight $B$*((RU20 index closing level$_{ICD}$/RU20 index closing level$_{RD}$)−1)+Weight $C$*((INT index closing level$_{ICD}$/INT index closing level$_{RD}$)−1)+Weight $D$*((EMG index closing level$_{ICD}$/EMG index closing level$_{RD}$)−1)+Weight $E$*((USD index closing level$_{ICD}$/USD index closing level$_{RD}$)−1)

In the foregoing formula, "ICD" refers to the current day. "RD" refers to the most recent rebalancing day 62. "DAYS" refers to the actual number of days from (but excluding) the most recent rebalancing day 62 to (and including) the current day. "Weight X" equals (1−(the sum of Weights A through D)).

In the present example, the current day is Jan. 8, 2007. On that day, index server 30 determines, based at least in part on market data 38, that SPTR index closing level$_{ICD}$=2178.80249. Based at least in part on market data 38 stored in index memory 44, index server 30 determines that SPTR index closing level$_{RD}$=2186.602783 (i.e., closing level 42 of the SPTR index on the most recent rebalancing day 62—Jan. 4, 2007). Index server 30 determines that Weight A is equal to −0.198. Index server 30 repeats the foregoing procedure for the other component indices 24. Based at least in part on the foregoing formula, index server 30 determines that the ATR is equal to −0.0066.

After determining the ATR, index server 30 determines closing level 42 of compound index 18 for the current day. In the present example, index server 30 is configured to determine the closing level 42 of compound index 18 according to the following formula:

Compound index closing level$_{ICD}$=(ATR+1)*compound index closing level$_{RD}$ In the foregoing formula, "ICD" refers to the current day. "RD" refers to the most recent rebalancing day 62. In the present example, index server 30 determines from data stored in index memory 44 that compound index closing level$_{RD}$ is 1460.15 (i.e., the compound index closing level 42 on Jan. 4, 2007). Based at least in part on the determined ATR, index server 30 then determines that the compound index closing level 42 for the current calculation day is 1450.56. In the present example, index server 30 transmits the determined compound index closing level 42 to clients 20 and to market data server 40. Market data server 40 may then disclose the determined compound index closing level 42 to market centers 50 and/or to other traders 14 in trading system 10.

In some embodiments, weights 34 of component indices 24 may be subject to constraints. In some embodiments, constraints represent limits that are configured to maintain compound index 18 within configurable thresholds. In the event that index server 30 imposes a particular constraint for a particular component index 24, the regression analysis may continue with respect to the other component indices 24 as if no constraints had been imposed. In the foregoing example, the respective weights 34 of the SPTR, INT, and USD indices may be constrained to have a value of greater than or equal to minus one and less than or equal to one. In this example, weight 34 of the EMG index may be constrained to be greater than or equal to zero and less than or equal to one, and weight 34 of the RU20 index may be constrained to be greater than or equal to −0.3 and less than or equal to one. Although particular constraint values are described herein, it should be understood that index server 30 may be configured to impose any suitable number and combination of constraints.

In the foregoing example, Weight A associated with the SPTR index has a negative value. In some embodiments, any negative weight value has the same effect on compound index 18 as if a short position had been created in the applicable component index 24.

In some embodiments, the sum of weights 34 of component indices 24 may exceed one. In certain embodiments, if the sum of weights 34 exceeds one, the computation of compound index 18 is associated with an element of leverage exposure.

In the foregoing example, compound index 18 is associated with five component indices 24. It should be understood, however, that compound index 18 may be associated with any number and combination of component indices 24.

Component indices 24 in the foregoing example comprise the SPTR, RU20, INT, EMG, and USD indices. In other embodiments, however, component indices 24 may comprise some or none of the foregoing indices. In certain embodiments, component indices 24 may comprise one or more commodity indices, one or more debt indices, one or more currency indices, one or more equity indices, and/or other indices associated with any suitable class of investment instruments 28.

In the foregoing example, compound index 18 emulates the HFRI index. The HFRI index generally represents an index of a plurality of constituent hedge funds. In some embodiments, the HFRI index includes both U.S. domestic and off-shore hedge funds. Although the foregoing example illustrates a particular compound index 18 that emulates the HFRI index, it should be understood that compound index 18 may be configured to emulate any suitable hedge fund index 22 and/or any number and combination of hedge fund indices 22. For example, compound index 18 may be configured to emulate the CSFB Credit Suisse/Tremont Hedge Fund Index, the FTSE Hedge Index, the DOW Jones Hedge Fund Index, the Eurekahedge Hedge Fund Index, and/or any suitable hedge fund index 22. As another example, compound index 18 may be configured to emulate the HFRI Equity Hedge Index and/or any suitable hedge fund index 22 that represents the performance of multiple hedge funds that employ long/short investment strategies.

In the foregoing example, component indices 24 comprise at least the SPTR index. In some embodiments, the SPTR index is the total return version of the S&P 500 Index. The S&P 500 Index is associated with the stocks of five hundred large-cap companies (mostly U.S. companies). According to certain embodiments, dividends may be reinvested on a daily basis. In some embodiments, Standard & Poor's acts as the index sponsor for the SPTR index. Although the foregoing example illustrates compound index 18 associated with the SPTR index, it should be understood that, in some embodiments, compound index 18 may not be associated with the SPTR index. According to certain embodiments, the SPTR index is an example of a U.S. large-cap equity index. In certain embodiments, compound index 18 may be based at least in part on any suitable component index 24 associated with securities of large-cap U.S. companies.

Component indices 24 in the foregoing example further comprise the RU20 index. According to certain embodiments, the RU20 index may be based at least in part on the Russell 2000 Index, which measures the performance of the 2,000 smallest companies in the Russell 3000 Index. The Russell 3000 Index is generally formed by listing U.S. companies in descending order by market capitalization. The top 3,000 stocks (those of the 3,000 largest U.S. companies) make up the Russell 3000 Index. The top 1,000 of those companies make up the large-cap Russell 1000 Index, and the bottom 2,000 (the smallest companies) make up the Russell 2000 Index. According to certain embodiments, the RU20 index is an example of a U.S. small-cap equity index. In some embodiments, the Russell Investment Group acts as the index sponsor for the RU20 index. Although the foregoing example illustrates compound index 18 associated with the RU20 index, it should be understood that, in some embodiments, compound index 18 may not be associated with the RU20 index. In certain embodiments, compound index 18 may be based at least in part on any suitable component index 24 associated with securities of small-cap U.S. companies.

In the foregoing example, component indices 24 further comprise the INT index. In some embodiments, the INT index is based at least in part on the MSCI EAFE Index (Europe, Australia, Far East) (the "EAFE Index"). According to certain embodiments, the EAFE Index is a free float-adjusted market capitalization index that is designed to measure developed market equity performance, excluding the U.S. and Canada. In some embodiments, Morgan Stanley Capital International acts as the index sponsor of the INT index. Although the foregoing example illustrates compound index 18 associated with the INT index, it should be understood that, in some embodiments, compound index 18 may not be associated with the INT index. In some embodiments, the INT index is an example of an international developed markets equity index. In certain embodiments, compound index 18 may be based at least in part on any suitable component index 24 associated with equity performance in developed markets.

Component indices 24 in the foregoing example further comprise the EMG index. In some embodiments, the EMG index is based at least in part on the MSCI EMF U.S. Dollar Index ("the EMF Index"). According to certain embodiments, the EMF Index is a free float-adjusted market capitalization index that is designed to measure equity market performance in global emerging markets. In some embodiments, Morgan Stanley Capital International acts as the index sponsor of the EMG index. Although the foregoing example illustrates compound index 18 associated with the EMG index, it should be understood that, in some embodiments, compound index 18 may not be associated with the EMG index. According to certain embodiments, the EMG index is an example of an international emerging markets equity index. In certain embodiments, compound index 18 may be based at least in part on any suitable component index 24 associated with equity market performance in global emerging markets.

In the foregoing example, component indices 24 further comprise the USD index. According to certain embodiments, the USD index indicates the general international value of the U.S. dollar. In particular, the USD index may average the exchange rates between the U.S. dollar and a plurality of major world currencies. Although the foregoing example illustrates compound index 18 associated with the USD index, it should be understood that, in some embodiments, compound index 18 may not be associated with the USD index. In certain embodiments, compound index 18 may be based at least in part on any suitable component index 24 associated with one or more currencies and/or one or more exchange rates.

In the foregoing example, compound index 18 is based at least in part on the Libor (e.g., BBA One Month USD Libor). The Libor, which is published by the British Bankers Association, generally represents a particular interest rate 32 that is applicable to the short-term international interbank market. In some embodiments, the Libor applies to large loans borrowed for anywhere from one day to five years. The short-term international interbank market associated with the Libor allows banks with liquidity requirements to borrow from other banks with surpluses, enabling banks to avoid holding excessively large amounts of their asset base as liquid assets. In some embodiments, the Libor is officially fixed once a day. Although the foregoing example illustrates interest rate 32 associated with the Libor, it should be understood that, in some embodiments, compound index 18 may not be associated with the Libor. In certain embodiments, compound index 18 may be based at least in part on any number and combination of interest rates 32.

In the foregoing example, weights 34 of component indices 24 are determined according to a linear regression. In other embodiments, however, weights 34 of component indices 24 may be determined according to a nonlinear regression, kernel regression, simple linear regression, multiple linear regression, polynomial interpolation, numerical integration, and/or any suitable number and combination of formulas, equations, tables, and/or algorithms.

In some embodiments, trading system 10 is operable to detect a market disruption event. A market disruption event may comprise a failure of the sponsor of component index 24 to publish closing level 42 of component index 24. In some embodiments, a market disruption event may comprise a disruption and/or failure associated with one or more market centers 50. In some embodiments, if index server 30 detects a market disruption event that affects a particular component index 24, index server 30 may determine closing level 42 of that particular component index 24 based at least in part on prevailing market conditions, last reported trading prices, and/or other information that is relevant to the valuation of the affected component index 24. According to certain embodiments, if index server 30 detects a market disruption event associated with a closure of one or more market centers 50, index server 30 may set closing level 42 of compound index 18 to be equal to closing level 42 of compound index 18 on the previous business day. In such embodiments, once market centers 50 reopen, index server 30 may determine a current closing level 42 of compound index 18.

The invention has several important technical advantages. Various embodiments of the invention may have none, some, or all of these advantages. One advantage is that trading system 10 provides a weighted compound index 18 associated with various component indices 24. In some embodiments, each component index 24 is associated with assets having intraday liquidity. The transaction costs of trading these assets are generally lower than the transaction costs associated with hedge funds. Thus, compound index 18 offers more liquidity and lower fees than hedge fund index 22.

Another advantage is that trading system 10 periodically updates weights 34 of component indices 24 that underlie compound index 18. Trading system 10 may configure weights 34 so that compound index 18 emulates the performance of hedge fund index 22. Thus, the compound index 18 may provide traders 14 with returns 26 similar to those provided by hedge fund index 22. In some embodiments, because compound index 18 emulates one or more hedge fund indices 22, compound index 18 provides a benchmark for the performance of alternative investments such as, for example, funds of funds, hedge funds, and investable hedge fund indices 22.

Figure 7:
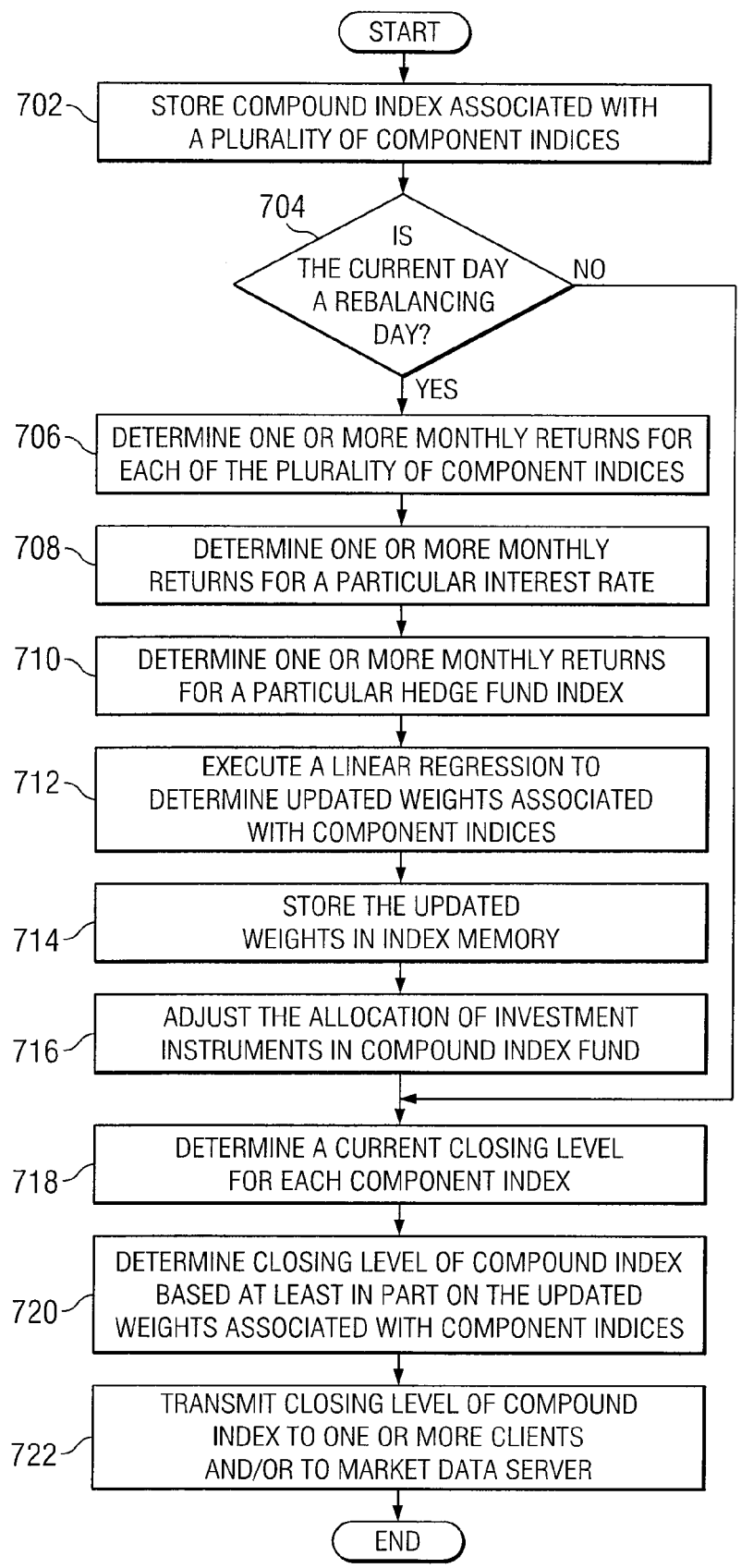
FIG. 7 illustrates a flowchart for updating compound index, according to certain embodiments.

FIG. 7 illustrates a flowchart for updating compound index 18, according to certain embodiments. The method begins at step 702 by storing in index memory 44 compound index 18. Compound index 18 may be based at least in part on interest rate 32 and/or on a plurality of component indices 24. The plurality of component indices 24 may comprise an equity index, a debt index, a commodity index, a currency index, and/or an index associated with any suitable number and combination of classes of investment instruments 28. In index memory 44, each component index 24 may be associated with a respective weight 34.

At step 704, index server 30 determines whether the current day is rebalancing day 62. If index server 30 determines at step 704 that the current day is not rebalancing day 62, the method continues to step 720. If, however, index server 30 determines at step 704 that the current day is rebalancing day 62, then at step 706 index server 30 may determine one or more monthly returns 26 for each of the plurality of component indices 24. In some embodiments, index server 30 may determine the monthly returns 26 based at least in part on market data 38 from market data server 40.

At step 708, index server 30 determines one or more monthly returns 26 for a particular interest rate 32. At step 710, index server 30 determines one or more monthly returns 26 for a particular hedge fund index 22 that is emulated by compound index 18.

At step 712, index server 30 may execute a linear regression to determine updated weights 34. Each of the updated weights 34 may be associated with a respective component index 24. The linear regression may be based at least in part on the determined returns 26 associated with component indices 24, the particular interest rate 32, and/or the particular hedge fund index 22. The linear regression may use monthly return data for a configurable sampling period 64 of time (e.g., twelve months, twenty-four months, etc.). The linear regression may be executed such that compound index 18 emulates the particular hedge fund index 22. At step 714, index server 30 may store the updated weights 34 in index memory 44.

In certain embodiments, compound index 18 may be associated with compound index fund 16. Compound index fund 16 may comprise a plurality of investment instruments 28 and may be managed by index server 30. At step 716, index server 30 may, based at least in part on the updated weights 34, adjust the allocation of investment instruments 28 in compound index fund 16. As an example, a particular compound index 18 may comprise a first set of investment instruments 28 corresponding to a first component index 24 associated with a first weight 34, a second set of investment instruments 28 corresponding to a second component index 24 associated with a second weight 34, and a third set of investment instruments 28 corresponding to a third component index 24 associated with a third weight 34. Upon updating the first, second, and third weights 34, index server 30 may adjust the number and/or type of investment instruments 28 in compound index fund 16 in proportion to the updated first, second, and third weights 34. In some embodiments, to adjust the proportions of investment instruments 28, index server 30 may generate and transmit to market center(s) 50 one or more trading orders 12.

At step 718, index server 30 determines a current closing level 42 for each component index 24. Index server 30 may determine the current closing levels 42 of component indices 24 based at least in part on market data 38 from market data server 40. At step 720, index server 30 determines closing level 42 of compound index 18. The determination may be based at least in part on the most recently determined set of weights 34 associated with component indices 24. The determination of closing level 42 of compound index 18 may be further based at least in part on the plurality of current closing levels 42 of component indices 24. At step 722, index server 30 transmits closing level 42 of compound index 18 to one or more clients 20 and/or to market data server 40. In some embodiments, index server 30 and/or market data server 40 may transmit closing level 42 of compound index 18 to one or more market centers 50. The method then ends.

Although the present invention has been described in detail, it should be understood the various changes, substitutions, and alterations can be made hereto without departing from the scope of the invention as defined by the appended claims.

What is claimed is:

1. A system, comprising:
a computer memory configured to store a compound index that is based at least in part on:
a plurality of component indices, wherein the plurality of component indices comprise:
an international developed markets equity index;
a United States large-cap equity index; and
a United States small-cap equity index;
and
a plurality of weights, wherein each weight is associated with a respective one of the plurality of component indices;
and
a computer processor that is communicatively coupled to the memory and configured to:
update the plurality of weights according to a regression analysis, wherein:
the regression analysis is based at least in part on a respective set of returns associated with each of the plurality of component indices and with a hedge fund index, wherein:
the hedge fund index is based at least in part on a plurality of hedge funds;
and
each of the plurality of hedge funds comprises long equities that are hedged with short sales of at least one of the following:
equities; and
equity options; and
the plurality of weights are updated such that the compound index emulates the hedge fund index;
determine a current compound index value based at least in part on the plurality of component indices and on the updated plurality of weights; and
transmits the current compound index value to one or more clients.

2. The system of claim 1, wherein:
the computer processor allocates a plurality of investment instruments of a fund;
the fund comprises:
a first set of investment instruments associated with the international developed markets equity index;
a second set of investment instruments associated with the United States large-cap equity index; and
a third set of investment instruments associated with the United States small-cap equity index;
and
the plurality of investment instruments are allocated according to the updated weights.

3. The system of claim 2, wherein allocating the plurality of investment instruments comprises generating one or more trading orders associated with at least one of the plurality of investment instruments.

4. The system of claim 1, wherein the hedge fund index is an equity hedge index.

5. The system of claim 1, wherein:
the international developed markets equity index is an United States dollar net total return index;
the United States large-cap equity index is a 500 total return index; and
the United States small-cap equity index is a 2000 total return index.

6. The system of claim 1, wherein the updating of the plurality of weights is based at least in part on an interest rate.

7. The system of claim 1, wherein the respective set of returns associated with a particular component index comprises a plurality of monthly returns associated with the particular component index; and
each monthly return is associated with a respective month from a sampling period that spans at least twelve months.

8. The system of claim 1, wherein:
each set of returns is updated on a monthly basis; and
the plurality of weights are updated on a monthly basis.

9. A method, comprising:
storing in a computer memory a value of a compound index that is based at least in part on:
a plurality of component indices, wherein the plurality of component indices comprise:
an international developed markets equity index;
a United States large-cap equity index; and
a United States small-cap equity index;
and
a plurality of weights, wherein each weight is associated with a respective one of the plurality of component indices;
updating, using a computer processor, the plurality of weights according to a regression analysis, wherein:
the regression analysis is based at least in part on a respective set of returns associated with each of the plurality of component indices and with a hedge fund index, wherein:
the hedge fund index is based at least in part on a plurality of hedge funds; and
each of the plurality of hedge funds comprises long equities that are hedged with short sales of at least one of the following:
equities; and
equity options; and
the plurality of weights are updated such that the compound index emulates the hedge fund index;
determining, using the computer processor, a current compound index value based at least in part on the plurality of component indices and on the updated plurality of weights; and
transmitting the current compound index value to one or more clients.

10. The method of claim 9, further comprising:
allocating a plurality of investment instruments of a fund, wherein:
the fund comprises:
a first set of investment instruments associated with the international developed markets equity index;
a second set of investment instruments associated with the United States large-cap equity index; and a third set of investment instruments associated with the United States small-cap equity index; and
the plurality of investment instruments are allocated according to the updated weights.

11. The method of claim 10, wherein allocating the plurality of investment instruments comprises generating one or more trading orders associated with at least one of the plurality of investment instruments.

12. The method of claim 9, wherein the hedge fund index is an equity hedge index.

13. The method of claim 9, wherein:
the international developed markets equity index is an United States dollar net total return index;
the United States large-cap equity index is a 500 total return index; and
the United States small-cap equity index is a 2000 total return index.

14. The method of claim 9, wherein the updating of the plurality of weights is based at least in part on an interest rate.

15. The method of claim 9, wherein the respective set of returns associated with a particular component index comprises a plurality of monthly returns associated with the particular component index; and
each monthly return is associated with a respective month from a sampling period that spans at least twelve months.

16. The method of claim 9, wherein:
each set of returns is updated on a monthly basis; and
the plurality of weights are updated on a monthly basis.

17. A computer readable medium tangibly embodied with executable code for updating a compound index, the code operable when executed by a computer processor to:
store a compound index that is based at least in part on:
a plurality of component indices, wherein the plurality of component indices comprise:
an international developed markets equity index;
a United States large-cap equity index; and
a United States small-cap equity index;
and
a plurality of weights, wherein each weight is associated with a respective one of the plurality of component indices;
update the plurality of weights according to a regression analysis, wherein:
the regression analysis is based at least in part on a respective set of returns associated with each of the plurality of component indices and with a hedge fund index, wherein:
the hedge fund index is based at least in part on a plurality of hedge funds;
and
each of the plurality of hedge funds comprises long equities that are hedged with short sales of at least one of the following:
equities; and
equity options; and
the plurality of weights are updated such that the compound index emulates the hedge fund index;
determine a current compound index value based at least in part on the plurality of component indices and on the updated plurality of weights; and
transmit the current compound index value to one or more clients.

18. The logic of claim 17, wherein:
the respective set of returns associated with a particular component index comprises a plurality of monthly returns associated with the particular component index; and
each monthly return is associated with a respective month from a sampling period that spans at least twelve months.

* * * * *

UNITED STATES PATENT AND TRADEMARK OFFICE
CERTIFICATE OF CORRECTION

PATENT NO. : 7,739,178 B2  Page 1 of 1
APPLICATION NO. : 12/022730
DATED : June 15, 2010
INVENTOR(S) : Steven R. Umlauf It is certified that error appears in the above-identified patent and that said Letters Patent is hereby corrected as shown below:

On the Title Pg, after Item "(63) Continuation-in-part of application No." delete "11/676,683" and insert -- 11/673,683 --.

Signed and Sealed this

Fifth Day of October, 2010

David J. Kappos
*Director of the United States Patent and Trademark Office*